US010554299B2

(12) United States Patent
Jiang

(10) Patent No.: US 10,554,299 B2
(45) Date of Patent: Feb. 4, 2020

(54) METHOD AND APPARATUS FOR CHARACTERIZING A DISPERSION OF AN OPTICAL MEDIUM

(71) Applicant: HUAWEI TECHNOLOGIES CO., LTD., Shenzhen, Guangdong (CN)

(72) Inventor: Zhiping Jiang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/590,168

(22) Filed: May 9, 2017

(65) Prior Publication Data
US 2018/0328709 A1    Nov. 15, 2018

(51) Int. Cl.
*H04B 10/079* (2013.01)

(52) U.S. Cl.
CPC .................. *H04B 10/079* (2013.01)

(58) Field of Classification Search
CPC .... G01B 9/0201; G01B 11/002; G01D 5/247; G06F 17/156; H04B 10/079; H04B 10/07951; H04J 14/02; G01M 11/38
See application file for complete search history.

(56) References Cited

U.S. PATENT DOCUMENTS

| | | | |
|---|---|---|---|
| 7,796,270 B2* | 9/2010 | Yelin | A61B 5/0066 356/456 |
| 2003/0180051 A1* | 9/2003 | Veith | G01M 11/338 398/81 |
| 2005/0110981 A1 | 5/2005 | Hayashi et al. | |
| 2013/0229662 A1* | 9/2013 | Ogawa | G01M 11/331 356/453 |
| 2015/0318921 A1 | 11/2015 | Zhao et al. | |
| 2016/0164599 A1* | 6/2016 | Heismann | H04B 10/07953 398/26 |

FOREIGN PATENT DOCUMENTS

| | | |
|---|---|---|
| CN | 1447554 A | 10/2003 |
| CN | 105099544 A | 11/2015 |

OTHER PUBLICATIONS

Kevin Miller, M2Optics, Inc., Chromatic Dispersion in Optical Fibers, Aug. 24, 2011 (4 pages).
Wikipedia, Amplified spontaneous emission last modified on Feb. 16, 2017 (3 pages).
Wikipedia, Cross-correlation last modified on Mar. 19, 2017 (7 pages).
Wikipedia, Precision Time Protocol last modified on Mar. 20, 2017 (10 pages).
ISA/CN, International Search Report and Written Opinion for PCT/CN2018/084726 dated Jun. 15, 2018 (10 pages).

* cited by examiner

*Primary Examiner* — Bryan Bui
(74) *Attorney, Agent, or Firm* — Trop, Pruner & Hu, P.C.

(57) ABSTRACT

In some examples, an apparatus receives a first measurement of a plurality of wavelength channels obtained at a first location of an optical medium, and a second measurement of the plurality of wavelength channels obtained at a second location of the optical medium. The apparatus computes a value relating to dispersion in the optical medium by correlating the first measurement and the second measurement.

19 Claims, 4 Drawing Sheets

METHOD AND APPARATUS FOR CHARACTERIZING A DISPERSION OF AN OPTICAL MEDIUM

BACKGROUND

Information can be transmitted over an optical medium such as an optical fiber or other type of optical medium. An optical signal transmitted through an optical medium may be subjected to distortions. One source of distortions includes chromatic dispersion. Chromatic dispersion causes different wavelengths of an optical signal to be transmitted through the optical medium at different velocities, such that the different wavelengths of the optical signal arrive at a receiver at different times. The result of chromatic dispersion is a spreading, or dispersion, of light pulses that convey the information being carried by the optical signal.

SUMMARY

According to aspects of the present disclosure, a value that characterizes a dispersion, such as a chromatic dispersion, caused by an optical medium is determined. The determination of the value that characterizes the dispersion can be based on measurements of wavelength channels obtained at different locations of the optical medium.

According to an aspect of the present disclosure, there is provided an apparatus that includes at least one processor to receive a first measurement of multiple wavelength channels obtained at a first location of the optical medium, receive a second measurement of the multiple wavelength channels obtained at a second location of the optical medium, and compute a value relating to dispersion in the optical medium by correlating the first measurement and the second measurement.

According to another aspect of the present disclosure, there is provided a method that includes receiving a first measurement of multiple wavelength channels obtained at a first location of the optical medium, and a second measurement of the multiple wavelength channels obtained at the second location of the optical medium, and correlating the first and second measurements to obtain a value relating to chromatic dispersion in the optical medium.

According to a further aspect of the present disclosure, there is provided a non-transitory machine-readable storage medium storing instructions that upon execution cause a processor to correlate a first measurement of multiple wavelength channels obtained at a first location of an optical medium with a second measurement of the multiple wavelength channels obtained at a second location of the optical medium, the correlating producing a value relating to chromatic dispersion in the optical medium.

Optionally, in any of the preceding aspects, in another implementation, the first measurement comprises a first waveform corresponding to the plurality of wavelength channels, and the second measurement comprises a second waveform corresponding to the plurality of wavelength channels. In an implementation, the correlating comprises performing a plurality of correlations of respective different sections of the first and second waveforms.

Optionally, in any of the preceding aspects, in another implementation, the performing of the plurality of correlations of respective different sections of the first and second waveforms comprises correlating a first section of the first waveform with a first section of the second waveform; and correlating the first section of the first waveform with a second section of the second waveform.

Optionally, in any of the preceding aspects, another implementation computes a value that corresponds to a time gap between a first correlation peak and a second correlation peak produced by the correlating of the first and second measurements.

Optionally, in any of the preceding aspects, in another implementation, each of the first measurement and the second measurement has a time length greater than the time gap.

Optionally, in any of the preceding aspects, in another implementation, the correlating of the first measurement and the second measurement comprises cyclically cross correlating the first measurement and the second measurement.

Optionally, in any of the preceding aspects, in another implementation, the value comprises a dispersion coefficient representing a chromatic dispersion of the optical medium.

Optionally, in any of the preceding aspects, in another implementation, the optical medium comprises an optical fiber, and the value comprises information identifying a type of the optical fiber.

Optionally, in any of the preceding aspects, in another implementation, the first and second measurements comprise a spectral portion of each of the plurality of wavelength channels to reduce intra-channel dispersion.

Optionally, in any of the preceding aspects, in another implementation, the first and second measurements comprise measurements that are timing synchronized with one another to within a time difference threshold.

Optionally, in any of the preceding aspects, in another implementation, the first and second measurements are from measurement devices each comprising a photodiode, electrical amplifier and an analog-to-digital converter.

Optionally, in any of the preceding aspects, in another implementation, the plurality of wavelength channels comprises dense wavelength division multiplexed (DWDM) channels.

Optionally, in any of the preceding aspects, another implementation provides, by a wavelength selective switch, the plurality of wavelength channels into the optical medium.

Optionally, in any of the preceding aspects, in another implementation, the receiving and the correlating are performed during a phase of a communication system prior to communicating data in the communication system.

Optionally, in any of the preceding aspects, in another implementation, the receiving and the correlating are performed during an operational phase of a communication system in which communication of data is performed.

BRIEF DESCRIPTION OF THE DRAWINGS

Some implementations of the present disclosure are described with respect to the following figures.

Figure 1:
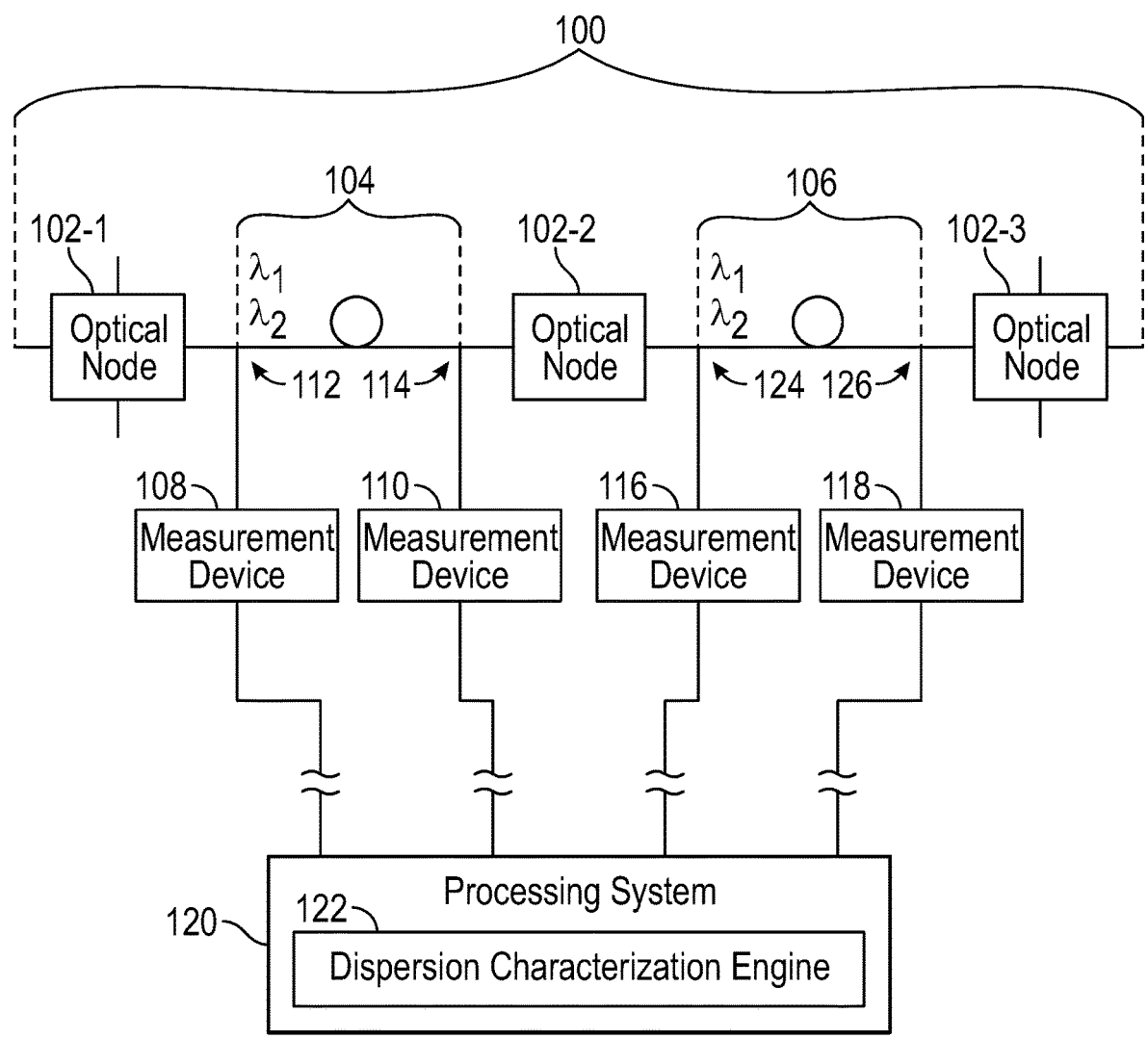
FIG. 1 is a block diagram of an example optical network including measurement devices and a processing system according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An optical network can include multiple spans of optical media, where an optical medium span can refer to a segment of an optical medium terminated at both ends with devices that add, subtract, filter, route, or otherwise process an optical signal. Examples of optical media can include any or some combination of the following: an optical fiber, an optical waveguide, or any other type of optical conduit in which light encoded with information can be transmitted.

An optical medium can cause distortion of an optical signal transmitted through the optical medium. One such type of distortion is chromatic dispersion. Chromatic dispersion is caused by the difference in speed between different wavelength components of an optical signal. The effect of chromatic dispersion in an optical medium is that different wavelength components of the optical signal are offset in time upon traveling through the optical medium.

The amount of chromatic dispersion can vary depending upon one or more characteristics of the optical medium, including the type of the optical medium, the length of the optical medium, or some other characteristic of the optical medium. Examples of different types of optical media include: a single-mode optical medium in which light is propagated only in a single transverse optical mode, a multi-mode optical fiber that allows for propagation of light in multiple optical modes, and so forth. A single-mode optical fiber can include the following sub-types: a standard single-mode optical fiber, a dispersion-shifted fiber (DSF), a polarization-maintaining fiber, etc.

The amount of chromatic dispersion that may be exhibited by each optical medium in an optical network may not be known in advance. It can be challenging to characterize the chromatic dispersion of various different optical media in an optical network. Manual characterization of chromatic dispersion in an optical medium may not be accurate. In other cases, automated characterizations of chromatic dispersion in optical media may either be inaccurate or may be complex and thus costly to implement.

In accordance with some implementations of the present disclosure, techniques or systems are provided to characterize chromatic dispersion in an optical medium in an efficient and accurate manner. FIG. 1 shows a portion of an example optical network 100, which includes various optical nodes 102-1, 102-2, and 102-3 interconnected by optical medium spans. An optical node can refer to any device (or collection of devices) used to apply some form of processing on an optical signal, such as adding an optical signal (for example, a wavelength channel), subtracting an optical signal (for example, a wavelength channel), switching an optical signal between different paths, amplifying an optical signal, propagating an optical signal, and so forth. In more specific examples, an optical node can include a reconfigurable optical add-drop multiplexer (ROADM), which may include a wavelength selective switch (WSS) that is able to add or drop individual wavelength(s) in a wavelength division multiplexing (WDM) optical network.

In FIG. 1, a first optical medium span 104 (or more simply an "optical medium 104") interconnects the optical nodes 102-1 and 102-2, and a second optical medium span 106 (or more simply "optical medium 106") interconnects the optical nodes 102-2 and 102-3.

As further shown in FIG. 1, for the purpose of characterizing chromatic dispersion in optical media in the optical network 100, various measurement devices 108, 110, 116, and 118 are provided. Although FIG. 1 shows an example where the measurement devices 108, 110, 116, and 118 are outside of the optical nodes 102-1, 102-2, and 102-3, it is noted that in other examples, the measurement devices 108, 110, 116, and 118 can be part of respective optical nodes. For example, the measurement device 108 can be part of the optical node 102-1, the measurement devices 110 and 116 can be part of the optical node 102-2, and the measurement device 118 can be part of the optical node 102-3.

The measurement devices 108, 110, 116, and 118 are able to measure waveforms in respective optical media 104 and 106. The measurement data are sent by the measurement devices 108, 110, 116, and 118 to a processing system 120, which is able to characterize chromatic dispersion in the respective optical media 104 and 106 (details provided further below).

In further examples, additional measurement devices can be provided to allow for characterization of chromatic dispersion in additional respective optical media of the optical network 100.

The measurement device 108 acquires a first measurement of multiple wavelength channels at a first location 112 of the optical medium 104, and the measurement device 110 acquires a second measurement of the multiple wavelength channels at a second location 114 of the optical medium 104. More specifically, the measurement device 108 measures a first waveform that is an aggregate of the multiple wavelength channels at the first location 112, and the measurement device 110 measures a second waveform that is an aggregate of the multiple wavelength channels at the second location 114. Herein, the term "wavelength channel" refers to an optical waveform at a respective wavelength, where the optical waveform is a time varying optical signal, such as a signal produced by on-off keying (OOK) modulation or other type of modulation to modulate data onto an optical carrier signal. The optical signal may also include an amplified spontaneous emission (ASE) signal (which can be the noise produced by an optical amplifier), or any other signal that varies with time. Each wavelength channel can be a dense wavelength division multiplexed (DWDM) channel. However, in other examples, each wavelength channel can be a coarse wavelength division multiplexing (CWDM) channel, or a flex-grid channel.

In some examples, the first location 112 is at a first end of the optical medium 104, and the second location 114 is at a second end of the optical medium 104. In different examples, the first and second locations 114 can be at other parts of the optical medium 104.

Figure 2:
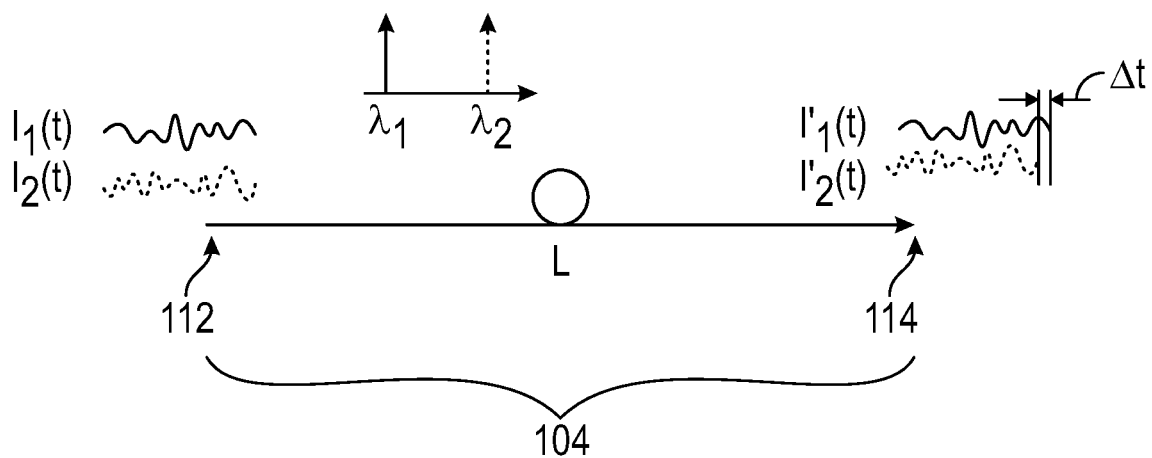
FIG. 2 illustrates waveforms at different locations of an optical medium, which can be processed according to some implementations to characterize a chromatic dispersion of the optical medium.

As further shown in FIG. 2, two wavelength channels correspond respectively to wavelength $\lambda_1$ and wavelength $\lambda_2$, respectively. More specifically, a first wavelength channel at wavelength $\lambda_1$ is represented by an intensity waveform $I_1(t)$, and a second wavelength channel at wavelength $\lambda_2$ is represented by an intensity waveform $I_2(t)$. An intensity waveform refers to an optical waveform having an intensity (or amplitude) that varies with time t. The intensity waveforms $I_1(t)$ and $I_2(t)$ are at the first location 112 of the optical medium 104.

After the wavelength channels at wavelengths $\lambda_1$ and $\lambda_2$ have propagated through the optical medium 104, the wavelength channels are represented as respective intensity waveforms $I_1'(t)$ and $I_2'(t)$ at the second location 114.

At the first location 112, the measurement device 108 (FIG. 1) acquires a first measurement that is an aggregate of $I_1(t)$ and $I_2(t)$, e.g., $I_1(t)+I_2(t)$. At the second location 114, the measurement device 110 acquires a second measurement that is an aggregate of $I_1'(t)$ and $I_2'(t)$, e.g., $I_1'(t)+I_2'(t)$.

Although FIGS. 1 and 2 show examples where wavelength channels corresponding to just two respective wavelengths $\lambda_1$ and $\lambda_2$ are used for the purpose of characterizing the chromatic dispersion of an optical medium, it is noted that more generally, N wavelength channels at respective N wavelengths can be used, where N≥2.

As further shown in FIG. 1, the measurement device 116 obtains a first measurement of wavelength channels at a first location 124 of the optical medium 106, and the measurement device 118 obtains a second measurement of wavelength channels at a second location 126 of the optical medium 106.

The measurement devices 108, 110, 116, and 118 can send respective measurement data to the processing system 120, which can include one or more computers, or alternatively, can include one or more processors. In further examples, the processing system 120 can be provided at one of the optical nodes 102-1, 102-2, or 102-3 (or another optical node).

The measurement devices 108, 110, 116, and 118 can send measurement data in digital form to the processing system 120 over the optical network 100, or alternatively, over dedicated links between the measurement devices 108, 110, 116, and 118 and the processing system 120.

The processing system 120 includes a dispersion characterization engine 122, which is able to characterize the chromatic dispersion of each optical medium 104 or 106 based on the measurement data received from the measurement devices 108, 110, 116, and 118. Characterizing the chromatic dispersion of an optical medium can refer to computing one or more values that relate to the chromatic dispersion.

As used here, an "engine" can refer to a hardware processing circuit, such as a microprocessor, a core of a multi-core microprocessor, a microcontroller, a programmable gate array, a programmable integrated circuit device, and so forth. Alternatively, an "engine" can refer to a combination of a hardware processing circuit and machine-readable instructions (e.g., software or firmware) executable on the hardware processing circuit.

In some examples, if intra-channel dispersion (discussed further below) is negligible, then the following relationships apply:

$$I_1'(t)=I_1(t'), \quad \text{(Eq. 1)}$$

$$I_2'(t)=I_2(t'+\Delta t), \quad \text{(Eq. 2)}$$

$$\Delta t = LD(\lambda_2-\lambda_1), \quad \text{(Eq. 3)}$$

where L is the length of the optical medium, D is the dispersion coefficient, and t' is the amount of time for the waveform $I_1(t)$ to travel from a first location (e.g., 112) of an optical medium to a second location (e.g., 114) of the optical medium. In addition, $\Delta t$ (also shown in FIG. 2) represents the delay in travel time of the wavelength channel at the wavelength $\lambda_2$ as compared to the travel time of the wavelength channel at the wavelength $\lambda_1$ caused by chromatic dispersion—in other words, if the travel time of the wavelength channel at the wavelength $\lambda_1$ over the optical medium is t', then the travel time of the wavelength channel at the wavelength $\lambda_2$ over the optical medium is t'+$\Delta t$ due to chromatic dispersion causing wavelength channels to propagate over the optical medium at different speeds.

The relationship $I_1'(t)=I_1(t)$ indicates that the intensity waveform $I_1'(t)$ at the second location is a shifted version of $I_1(t)$, i.e., shifted by t', which is the time of travel from of the waveform from the first location to the second location. The relationship $I_2'(t)=I_2(t'+\Delta t)$ indicates that the intensity waveform $I_2'(t)$ is a shifted version of $I_2(t)$, i.e., shifted by t'+$\Delta t$.

The time gap $\Delta t$ is an example of a value that relates to chromatic dispersion in an optical medium. In accordance with some implementations of the present disclosure, the dispersion characterization engine 122 is able to compute $\Delta t$ for the optical medium 104 using the first and second measurements acquired by the measurement devices 108 and 110. In further examples, the dispersion characterization engine 122 is able to compute other values that relate to chromatic dispersion of the optical medium 104, including the dispersion coefficient D, a type of the optical medium, and so forth.

The dispersion coefficient D is computed based on the relationship $\Delta t=LD(\lambda_2-\lambda_1)$, assuming that the length L of the optical medium is known or can be derived. The dispersion coefficient D can be expressed as time per wavelength difference (e.g., picoseconds/nanometer), and represents a change in delay as a function of wavelength.

In some implementations of the present disclosure, the dispersion characterization engine 122 can correlate the first measurement ($I_1(t)+I_2(t)$) acquired by the measurement device 108 with the second measurement ($I_1'(t)+I_2''(t)$) acquired by the measurement device 110 to compute a value relating to chromatic dispersion in the optical medium 104. In some examples, the correlation between the first measurement and the second measurement can be a cyclic cross correlation (also referred to as a circular cross correlation). In signal processing, cross correlation of a first measurement and a second measurement provides a measure of similarity of the first and second measurements as a function of the displacement of the first measurement relative to the second measurement. Circular cross correlation refers to cross correlation where any portion of a first sequence (one of the first measurement and second measurement) that is out of range of a second sequence (the other of the first measurement and second measurement) is wrapped back to the beginning or end of the first sequence.

The circular cross correlation between the first measurement ($I_1(t)+I_2(t)$) and the second measurement ($I_1'(t)+I_2''(t)$) can be expressed as $$\begin{aligned}&\text{cxcorr}(I_1(t)+I_2(t),\\ &I_1'(t)+I_2'(t)) = \text{cxcorr}(I_1(t), I_1'(t)) + \text{cxcorr}(I_2(t), I_2'(t)) +\\ &\qquad \text{cxcorr}(I_1(t), I_2'(t)) + \text{cxcorr}(I_2(t), I_1'(t)).\end{aligned} \quad \text{(Eq. 4)}$$

In Eq. 4, the circular cross correlation expression cxcorr is represented as $$\text{cxcorr}(I_B(t), I_A(t)) = \text{ifft}(\text{fft}(I_A \times \text{conj}(\text{fft}(I_B(t)))) \quad \text{(Eq. 5)}$$

where fft represents a fast Fourier transform, ifft represents an inverse fast Fourier transform, and conj is the complex conjugation.

Figure 3:
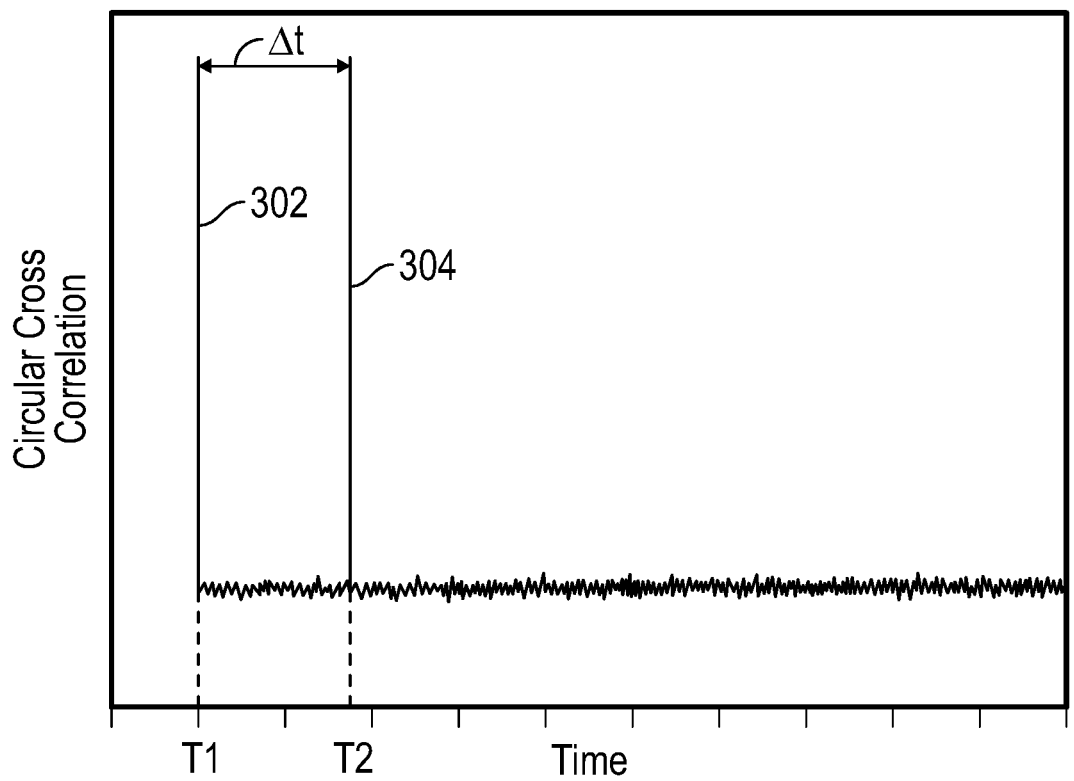
FIG. 3 is a plot of values produced by a circular cross correlation applied on measurements at different locations of an optical medium, according to some implementations.

In Eq. 4, cxcorr($I_1(t)$, (t)) produces a correlation peak 302 in FIG. 3, while cxcorr($I_2(t)$, $I_2'(t)$) produces a correlation peak 304 in FIG. 3. FIG. 3 plots a circular cross correlation value (which is the output of the circular cross correlation) as a function of time. The correlation peak 302 indicates that the circular cross correlation has identified a high correlation (high degree of similarity) between the first measurement and the second measurement at time T1, and the correlation peak 304 indicates that the circular cross correlation has identified a high correlation between the first measurement and the second measurement at time T2.

The expression cxcorr($I_1(t)$, $I_2'(t)$)+cxcorr($I_2(t)$, $I_1'(t)$) in Eq. 4 does not produce a correlation peak.

The time gap $\Delta t$ between the correlation peaks 302 and 304 indicates the delay caused by chromatic dispersion in the optical medium 104 of the wavelength channel at the wavelength $\lambda_2$ relative to the wavelength channel at the wavelength $\lambda_1$.

The time gap $\Delta t$ is one example of a value relating to chromatic dispersion of an optical medium that can be computed by the dispersion characterization engine 122.

In other examples, other values relating to chromatic dispersion in the optical medium can be computed, including the dispersion coefficient D, a type of the optical medium, and so forth. The dispersion coefficient D representing chromatic dispersion can be calculated according to Eq. 6 below, where Eq. 6 is derived from Eq. 3 above:

$$D = \frac{\Delta t}{L(\lambda_2 - \lambda_1)}. \qquad (Eq.\ 6)$$

The length L of the optical medium can be measured using any of various techniques, such as by measuring a round-trip time of a unit of data transmitted over the optical medium, e.g., using an optical time-domain reflectometry (OTDR) technique. Alternatively, the length L can be determined by physically measuring the distance between optical nodes connected by the optical medium under investigation.

In some examples, once the dispersion coefficient D in an optical medium is determined, then the dispersion coefficient D can be used to determine the type of the optical medium. For example, empirical data can be collected that relates different values of the dispersion coefficient D to respective different types of optical media. A lookup table or other mapping data structure can be derived from the empirical data to map values (or ranges of values) of the dispersion coefficient D respective different types of optical media.

Thus, a computed value of the dispersion coefficient D can be used to retrieve a corresponding type of optical medium from the lookup table or other mapping data structure. For example, if the computed value of the dispersion coefficient D falls within a first range of values in the lookup table, then the corresponding first entry of the lookup table is retrieved, where the retrieved first entry includes the respective type of the optical medium.

In other examples, a lookup table or other data structure can relate other dispersion-related values (e.g., time gaps $\Delta t$) to corresponding types of optical media.

In some examples, to achieve improved accuracy in characterizing chromatic dispersion of an optical medium, the difference in the wavelengths of the wavelength channels can be increased, which allows for increased accuracy in detecting correlation peaks of the first and second measurements acquired at different locations of an optical medium. Moreover, correlation peaks can be more accurately detected by using wavelength channels with similar optical power (e.g., the optical power of a first wavelength channel is within a specified power threshold of the optical power of a second wavelength channel).

Figure 4:
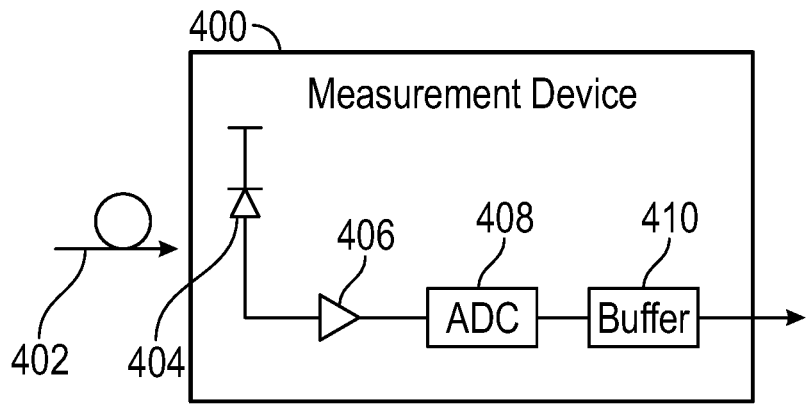
FIG. 4 is a block diagram of a measurement device according to some implementations.

FIG. 4 shows an example of a measurement device 400, which can be any of the measurement devices 108, 110, 116, and 118. In some examples, the measurement device 400 can be part of an Erbium-doped fiber amplifier. In other examples, the measurement device 400 can be a different type of device.

The measurement device 400 can include a photodiode 404 to detect an optical signal at a given location of an optical medium 402. Based on the optical signal detected in the optical medium 402, the photodiode 404 outputs an analog electrical measurement signal. The analog measurement signal output from the photodiode 402 is provided to an amplifier 406, which sends an amplified version of the analog measurement signal to an analog-to-digital converter (ADC) 408. In some examples, the amplifier 406 can be omitted.

The ADC 408 converts the analog measurement signal into digital measurement data. In examples where the measurement device includes a buffer 410, the digital measurement data can be temporarily stored in the buffer 410, prior to transmission to the processing system 120 (FIG. 1). In other examples, the buffer 410 can be omitted. Note that the digital measurement data can be modulated onto an optical carrier signal for transmission over an optical network (e.g., 100 in FIG. 1) to the processing system 120.

The measurement device 400 shown in FIG. 4 is an example of a relatively simple measurement device that is inexpensive. Use of the measurement device 400 to acquire measurements can provide a relatively cost-effective way of characterizing chromatic dispersion in optical media.

To resolve correlation peaks (e.g., 302 and 306) produced by applying the circular cross correlation on measurements acquired by different measurement devices 400 at respective different locations of an optical medium, the sampling time interval of each measurement device 400 is minimally set to a value smaller than $\Delta t$, and in some examples much smaller (e.g., an order of magnitude) than $\Delta t$. A sampling time interval refers to a time interval at which digital measurement data is repeatedly acquired by a measurement device 400. For example, if the sampling time interval is set to 2 nanoseconds, then the measurement device 400 acquires a sample of measurement data every 2 nanoseconds.

In some examples, some amount of timing synchronization is provided when acquiring measurements by respective measurement devices 400 at two or more locations of an optical medium. Acquisition of measurements is timing synchronized if the measurements are made at substantially the same time, where "substantially the same time" can refer to respective measurement devices acquiring their respective measurements within some specified amount of time of each other, such as within 50 nanoseconds, 20 nanoseconds, 10 nanoseconds, 5 nanoseconds, and so forth. Stated differently, the measurements are timing synchronized with one another to within a time difference threshold.

Any of various synchronization techniques can be employed, such as, for example, a synchronization technique according to the Precision Time Protocol (PTP), as defined by the Institute of Electronics and Electrical Engineers (IEEE) 1588-2008 standard. In other examples, service frames or other specified timing packets can be transmitted through an optical network for use in synchronizing devices at different points of the optical network.

In some examples, the timing synchronization at multiple measurement devices can be relaxed if a longer waveform is captured by the measurement devices. As explained further below, capturing longer waveforms allows for common sections of the captured waveforms to be correlated.

Generally, the captured waveform is set to be much longer than Δt. Increasing the time length of the captured waveform can lead to more accurate results if there are timing synchronization errors. Also, longer captured waveforms can provide better signal-to-noise ratio (SNR) performance and thus correlation peaks can be detected more accurately.

Measurements for characterizing chromatic dispersion can be acquired during system startup, which refers to a phase of an optical network when the devices of the optical network are initially starting and no bearer data is being communicated in the optical network. Bearer data refers to data transmitted by one endpoint device to one or more other endpoint devices over the optical network.

At system startup, a wavelength selective switch (WSS) or other type of wavelength selector can be used to select the wavelengths of the wavelength channels to be propagated over an optical medium under consideration, where the selected wavelengths are those wavelengths to be used in characterizing chromatic dispersion in an optical medium. The WSS or other type of wavelength selector can be part of an optical node (e.g., 102-1, 102-2, 102-3 in FIG. 1).

In other examples, the characterization of chromatic dispersion in an optical medium can be performed when the optical network is "online," i.e., the optical network is being used by endpoint devices to communicate bearer data. When bearer data is actually being communicated over an optical medium, there can be more than the target N wavelength channels transmitted over the optical medium, where the N wavelength channels are those wavelength channels to use for characterizing chromatic dispersion, while the remaining wavelength channels may carry bearer data. A mechanism can be used to select the N wavelength channels from among the multiple wavelength channels to measure, where such selection can be by use of a filter at the measurement device 400 to remove wavelength channels not used for characterizing chromatic dispersion.

To achieve superior correlation between measured waveforms at respective first and second locations of an optical medium under investigation, the same section of the measured waveforms should be used. This may not always be possible due to timing synchronization error at the corresponding measurement devices. To address this issue, longer waveforms can be acquired. Multiple correlations can be performed, with each correlation corresponding to a different section of the captured waveforms.

Figure 5:
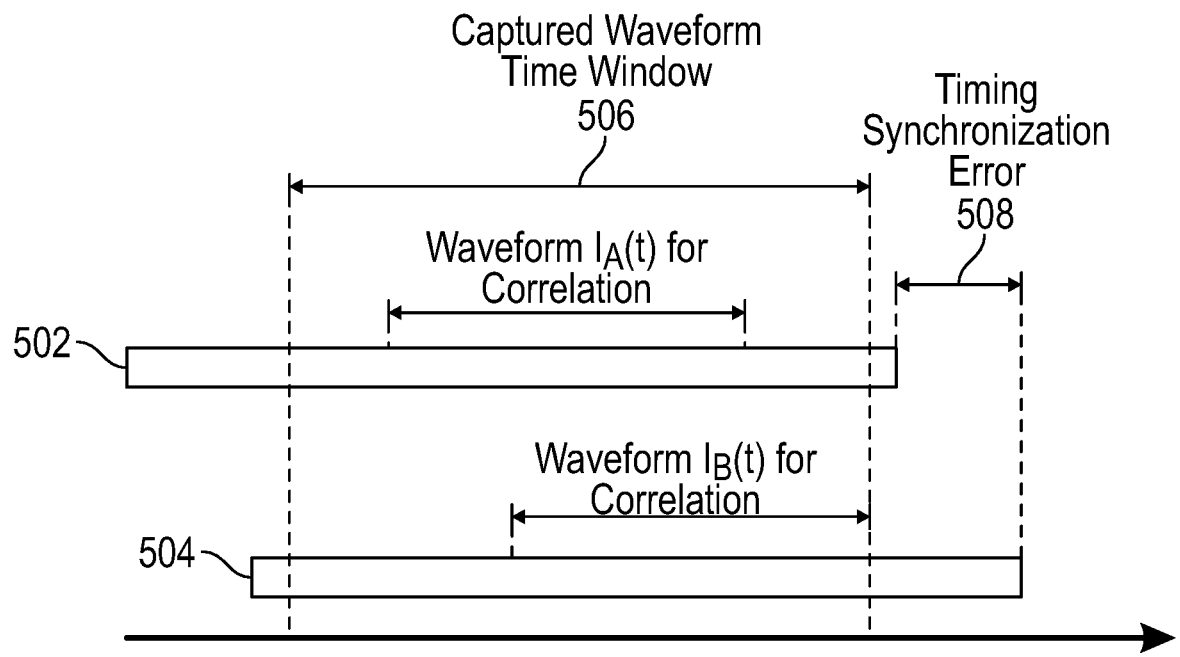
FIG. 5 illustrates waveforms that are offset due to a timing synchronization error, according to some examples.

FIG. 5 shows an example illustrating a waveform 502 at a first location of an optical medium under investigation, and a waveform 504 at a second location of the optical medium under investigation. The captured waveform at each of the first and second locations falls within a time window 506. A timing synchronization error 508 between the measurement devices at the first and second locations is represented as 508. A timing synchronization error refers to a time offset between when the first measurement device acquired its respective waveform and the second measurement device acquired its respective waveform.

Multiple iterations of the circular cross correlation can be performed using just a section (that has a time length that is less than the captured waveform time window 506) of each of the captured waveforms 502 and 504. The section of the waveform 502 that is being correlated in a given iteration of the circular cross correlation is represented as $I_A(t)$, and the section of the waveform 504 that is being correlated in the given iteration is represented as $I_B(t)$.

The waveform sections $I_A(t)$ and $I_B(t)$ that are processed by a first iteration of the circular cross correlation can be offset from one another by a first amount, such as by the time duration of the timing synchronization error 508. For a second iteration of the circular cross correlation, a different section $I_A(t)$ and/or $I_B(t)$ of the captured waveform 502 and/or 504 can be selected, such that the waveform sections $I_A(t)$ and $I_B(t)$ are offset from one another by a different second amount.

Similarly, for a third iteration of the circular cross correlation, a further different section $I_A(t)$ and/or $I_B(t)$ of the captured waveform 502 and/or 504 can be selected, such that the waveform sections $I_A(t)$ and $I_B(t)$ are offset from one another by a different third amount.

In a specific example, the waveform section $I_A(t)$ can be left unchanged in the multiple iterations of the circular cross correlation, while successively different waveform sections $I_B(t)$ of the waveform 504 are successively selected. For example, after the first iteration of the cross correlation between $I_A(t)$ and $I_B(t)$, a first different waveform section $I_B(t)$ that is further back in time by a specified time increment is selected, and a second iteration of the cross correlation can be performed between $I_A(t)$ and the first different waveform section $I_B(t)$. Following the second iteration of the cross correlation, a second different waveform section $I_B(t)$ that is further back in time by a specified time increment $I_B(t)$ can be selected, and a third iteration of the cross correlation can be performed between $I_A(t)$ and the second different waveform section $I_B(t)$. This process can continue until a stopping criterion is satisfied, such as when the selected different waveform section $I_B(t)$ has a beginning that coincides with the beginning of the time window 506.

More generally, successive iterations of the circular cross correlation involves selecting different waveform sections $I_A(t)$ and/or $I_B(t)$ and applying the circular cross correlation on the different waveform sections.

The dispersion characterization engine 122 (FIG. 1) can compare the outputs of the respective multiple iterations of the circular cross correlation. The output with the best result can be selected by the dispersion characterization engine 122. A determination of whether the result of a first iteration of the circular cross correlation is better than the result of a second iteration of the circular cross correlation can be based on the magnitudes of the correlation peaks—a better circular cross correlation between waveforms sections $I_A(t)$ and $I_B(t)$ would result in correlation peaks of larger magnitudes.

In the foregoing, an assumption was made that the intra-channel dispersion is negligible. In other cases, intra-channel dispersion can cause a shape of a waveform (at a given wavelength) to change at the beginning and end of an optical medium under consideration. Due to the intra-channel dispersion, the waveform at the second location of the optical medium may no longer be just a shifted version (in time) of the waveform at the first location of the optical medium. In other words, due to intra-channel dispersion: $I_1'(t) \neq I_1(t')$, $I_2(t) \neq I_2(t'+\Delta t)$.

Intra-channel dispersion can lead to de-correlation. To address this issue, a lower baud rate channel can be used. For example, a wavelength selective switch or merely a narrow bandpass optical filter can be used to pass only a portion of a wavelength channel to reduce the effective baud rate (the rate at which information is communicated). Selecting a portion of a wavelength channel refers to selecting a spectral portion (less than the entirety) of the wavelength channel in the frequency domain.

Figure 6:
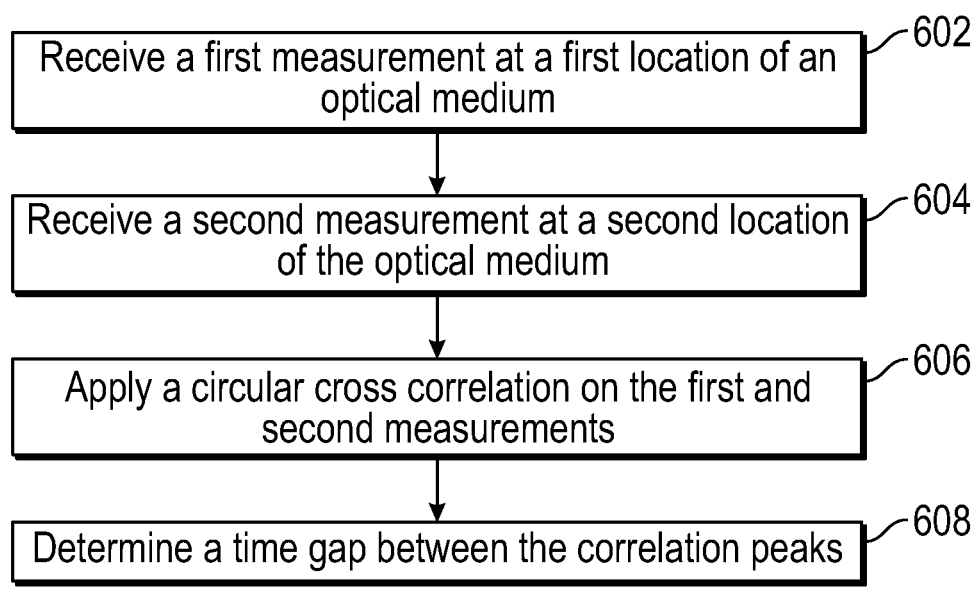
FIG. 6 is a flow diagram of a process according to some implementations.

FIG. 6 is a flow diagram of an example process for characterizing a chromatic dispersion of an optical medium, according to some implementations of the present disclosure. The process can be performed by the dispersion characterization engine 122 of FIG. 1, for example.

The process includes receiving (at 602) a first measurement at a first location of an optical medium, where the first measurement is of multiple wavelength channels. The process further includes receiving (at 604) a second measurement at a second location of the optical medium, where the second measurement is of the multiple wavelength channels.

The process further includes applying (at 606) a circular cross correlation on the first and second measurements. The applied circular cross correlation produces correlation peaks. The process then determines (at 608) a time gap between the correlation peaks, where the time gap is the time delay, caused by chromatic dispersion, of one wavelength channel relative to another wavelength channel in traveling through the optical medium. More generally, the process may compute a value relating to dispersion in the optical medium by correlating the first measurement and the second measurement.

As noted above, in some examples, the dispersion characterization engine 122 can be implemented at least in part by machine-readable instructions, which can be executable on a hardware processing circuit. The machine-readable instructions can be stored in a non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
at least one processor to:
receive a first measurement of a plurality of wavelength channels obtained by a first measurement device at a first location of an optical medium, wherein the first measurement comprises a first waveform corresponding to the plurality of wavelength channels;
receive a second measurement of the plurality of wavelength channels obtained by a second measurement device at a second location of the optical medium, wherein the second measurement comprises a second waveform corresponding to the plurality of wavelength channels; and
compute a value relating to dispersion in the optical medium by performing a plurality of correlations of respective different sections of the first and second waveforms, wherein the performing of the plurality of correlations of respective different sections of the first and second waveforms comprises:
correlating a first section of the first waveform with a first section of the second waveform; and
correlating the first section of the first waveform with a second section of the second waveform.

2. The apparatus of claim 1, wherein the at least one processor is to:
output the value for characterizing the dispersion in the optical medium.

3. The apparatus of claim 1, wherein the first waveform comprises a first intensity waveform, and the second waveform comprises a second intensity waveform.

4. The apparatus of claim 1, wherein the value represents a time gap between a first correlation peak and a second correlation peak produced by the correlating.

5. The apparatus of claim 4, wherein each of the first measurement and the second measurement has a time length greater than the time gap.

6. The apparatus of claim 1, wherein the plurality of correlations comprises cyclically cross correlating the first measurement and the second measurement.

7. The apparatus of claim 1, wherein the value comprises a dispersion coefficient representing a chromatic dispersion of the optical medium.

8. The apparatus of claim 1, wherein the optical medium comprises an optical fiber, and wherein the value comprises information identifying a type of the optical fiber.

9. The apparatus of claim 1, wherein the first and second measurements comprise a spectral portion of each of the plurality of wavelength channels to reduce intra-channel dispersion.

10. The apparatus of claim 1, wherein the first and second measurements comprise measurements that are timing synchronized with one another to within a time difference threshold.

11. The apparatus of claim 1, wherein each of the first and second measurement devices comprises a photodiode and an analog-to-digital converter.

12. A method comprising:
receiving, by at least one processor, a first measurement of a plurality of wavelength channels obtained at a first location of an optical medium, and a second measurement of the plurality of wavelength channels obtained at a second location of the optical medium, the first measurement comprising a first intensity waveform and obtained by a first measurement device at the first location, and the second measurement comprising a second intensity waveform and obtained by a second measurement device at the second location;
correlating, by the at least one processor, the first and second measurements to obtain a value relating to chromatic dispersion in the optical medium, wherein correlating the first and second measurements comprises performing a plurality of correlations of respective different sections of the first and second intensity waveforms, comprising:

correlating a first section of the first intensity waveform with a first section of the second intensity waveform;

correlating the first section of the first intensity waveform with a second section of the second intensity waveform; and outputting, by the at least one processor, the value for characterizing the chromatic dispersion in the optical medium.

13. The method of claim 12, wherein the first intensity waveform corresponds to the plurality of the wavelength channels, and the second intensity waveform corresponds to the plurality of wavelength channels.

14. The method of claim 12, wherein the plurality of wavelength channels comprises dense wavelength division multiplexed (DWDM) channels.

15. The method of claim 12, further comprising providing, by a wavelength selective switch, the plurality of wavelength channels into the optical medium.

16. The method of claim 12, wherein the receiving and the correlating are performed during a phase of a communication system prior to communicating data in the communication system.

17. The method of claim 12, wherein the receiving and the correlating are performed during an operational phase of a communication system in which communication of data is performed.

18. A non-transitory machine-readable storage medium storing instructions that upon execution cause a processor to:

correlate a first measurement of a plurality of wavelength channels obtained by a first measurement device at a first location of an optical medium with a second measurement of the plurality of wavelength channels obtained by a second measurement device at a second location of the optical medium, the correlating producing a value relating to chromatic dispersion in the optical medium, the first measurement comprising a first intensity waveform, and the second measurement comprising a second intensity waveform, wherein correlating the first and second measurements comprises performing a plurality of correlations of respective different sections of the first and second intensity waveforms, comprising:

correlating a first section of the first intensity waveform with a first section of the second intensity waveform;

correlating the first section of the first intensity waveform with a second section of the second intensity waveform; and output the value for characterizing the chromatic dispersion in the optical medium.

19. The non-transitory machine-readable storage medium of claim 18, wherein the value relating to chromatic dispersion in the optical medium is selected from a list consisting of a time gap between correlation peaks produced by the correlating, a dispersion coefficient representing the chromatic dispersion, and information of a type of the optical medium.

* * * * *